United States Patent [19]
Bloomfield

[11] Patent Number: 6,057,857
[45] Date of Patent: May 2, 2000

[54] METHOD FOR THE LOSSLESS COMPRESSION OF LINES IN A DISTRIBUTED COMPUTER SYSTEM

[75] Inventor: Marc A. Bloomfield, Lighthouse Point, Fla.

[73] Assignee: Citrix Systems, Inc., Fort Lauderdale, Fla.

[21] Appl. No.: 08/662,590

[22] Filed: Jun. 12, 1996

[51] Int. Cl.$^7$ .................................................. G06T 11/00
[52] U.S. Cl. ........................ 345/441; 345/442; 345/443; 345/135
[58] Field of Search ..................... 345/423, 441, 345/442, 443, 144, 468, 469, 135; 382/241, 242, 244

[56] References Cited

U.S. PATENT DOCUMENTS

| | | | |
|---|---|---|---|
| 4,949,281 | 8/1990 | Hillenbrand et al. | 345/442 |
| 5,115,479 | 5/1992 | Murayama | 345/144 |
| 5,231,697 | 7/1993 | Yamada | 345/442 |
| 5,309,555 | 5/1994 | Akins et al. | 345/330 |
| 5,473,742 | 12/1995 | Polyakov et al. | 345/442 |
| 5,566,288 | 10/1996 | Koerhsen | 345/442 |

FOREIGN PATENT DOCUMENTS

| | | |
|---|---|---|
| 0684583 A2 | 11/1995 | European Pat. Off. . |
| 0684582 A3 | 4/1997 | European Pat. Off. . |
| WO 94/03853 | 2/1994 | WIPO . |

*Primary Examiner*—Stephen S. Hong
*Attorney, Agent, or Firm*—Testa, Hurwitz & Thibeault, LLP

[57] ABSTRACT

In a distributed computer system, a method for lossless compression of a graphical line within an application server allows the compressed line data to be transmitted over a low bandwidth transport mechanism to a graphical user interface for display on a workstation. The application server determines, from graphical line data representative of the graphical line, coordinate locations for the endpoints of each sub-path of the graphical line and attributes of each sub-path. The application server generates a compressed line data packet of variable length which includes the coordinate location data and attribute data for each sub-path of the graphical line.

16 Claims, 6 Drawing Sheets

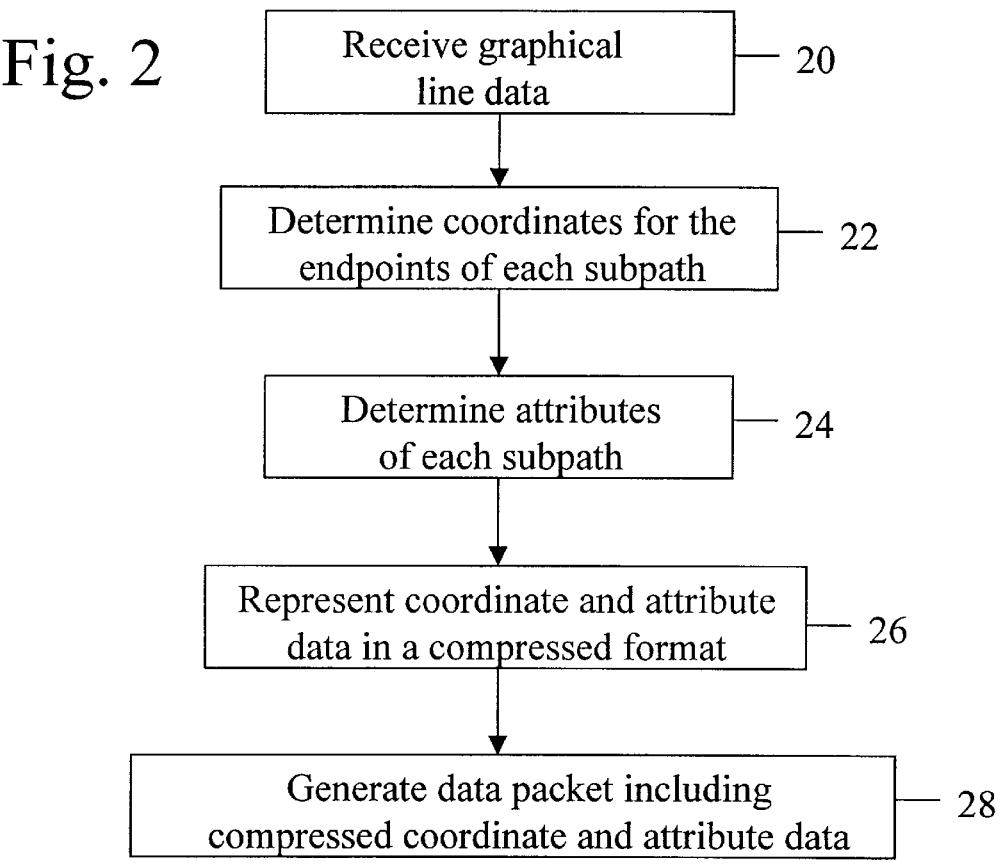
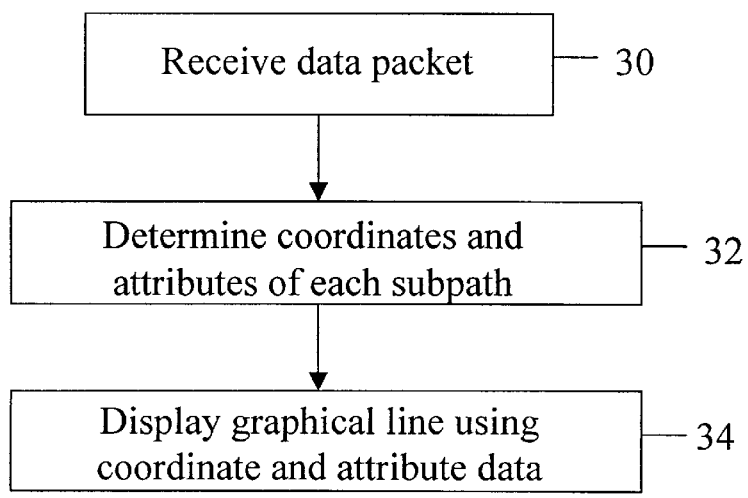

METHOD FOR THE LOSSLESS COMPRESSION OF LINES IN A DISTRIBUTED COMPUTER SYSTEM

FIELD OF THE INVENTION

The invention relates generally to the field of data compression in a distributed computer system. In particular, the invention relates to a method for lossless compression of a graphical line, including its attributes, within an application server before transmitting the compressed line data to the graphical user interface of a workstation over a low bandwidth communication transport mechanism.

BACKGROUND OF THE INVENTION

Distributed computer systems utilize the technique of distributing application execution. More specifically, an application server provides application execution services to network users rather than running the application at the user's workstation. When an application runs, the application server intercepts the user's interface (e.g., the display screen, keyboard, and mouse) data and transmits/receives this data to/from a user program running at the user's workstation. For example, when an application involves graphical lines, the application server intercepts the graphical user interface and interacts with the user program to display lines on a display at the user's workstation.

Graphical lines are frequently required in most processing operations and come in various forms, including straight, arcs, ellipses, and bezier curves. In many distributed computer systems, it is desirable for the application server to communicate graphical line data to workstations over a low bandwidth communication transport mechanism, such as serial lines, telephone lines, local area networks and wide area networks.

In one known implementation, graphical curved lines are transmitted by the application server as pixel coordinates, with each pixel definition being 7 bytes in length. However, every active pixel is transmitted as there is no interpolation method employed at the receiving workstation. If, for example, a small circle consists of 1000 active pixels, then 7000 bytes of data are transmitted by the application server. Non-curved lines are transmitted as pixel coordinates, with each pixel representing an endpoint of a straight line. The receiving workstation is responsible for interpolating between every two endpoints. Each endpoint is represented as 4 bytes, and each set of endpoints includes an additional header 27 bytes in length. For example, a simple straight line of two points requires 35 bytes (27+4*(2)). Using this known implementation, the transmission of uncompressed data over a low bandwidth transport mechanism would be too slow for adequate usability.

It is therefore a principal object of this invention to provide a method for the lossless compression of lines in a distributed computer system that allows for the use low bandwidth communication transport mechanism, such as serial lines, telephone lines, local area networks and wide area networks.

SUMMARY OF THE INVENTION

Accordingly, the present invention features a method for the lossless compression of graphical line data for transmission from an application server over a low bandwidth communication transport mechanism to a graphical user interface of a workstation in a distributed computer system. The graphical line data is representative of a graphical line to be displayed on a display screen of the workstation.

In one embodiment, the lossless compression method of the invention is realized within the application server. The application server determines, from graphical line data, coordinate locations for the endpoints of each sub-path of the graphical line. The application also determines attributes of each sub-path from the graphical line data. The application server represents the coordinate locations as compressed coordinate location data of variable length and the attributes as compressed attribute data of variable length. The application server then generates a compressed line data packet of variable length which includes said compressed coordinate location data and said compressed attribute data for each sub-path.

The compressed line data packet generated by the application server fully defines the characteristics of the graphical line. The compressed line data packet is transmitted over a low bandwidth communication transport mechanism to the workstation. A decompression program in the workstation determines the graphical line data (i.e., coordinate locations for the endpoints of each sub-path of the graphical line and attributes of each sub-path) by decompressing the variable length compressed line data packet. The graphical user interface uses the decompressed graphical lines data to display the graphical line on the display screen of the workstation.

The invention offers the following noteworthy features. First, the invention compresses graphical lines and their attributes with a high average compression ratio. Second, the invention achieves lossless data compression (i.e., 100% reversible). Third, the invention does not require additional data for the decompression processes.

BRIEF DESCRIPTION OF THE DRAWINGS

This invention is described with particularity in the appended claims. The above and further advantages of this invention may be better understood by referring to the following description taken in conjunction with the accompanying drawings, in which:

FIG. 2 is a flow chart illustrating the basic graphical line compression method of the present invention.

FIG. 3 is a flow chart illustrating the basic line decompression method used in connection with the line compression method of the invention.

DETAILED DESCRIPTION

Figure 1:
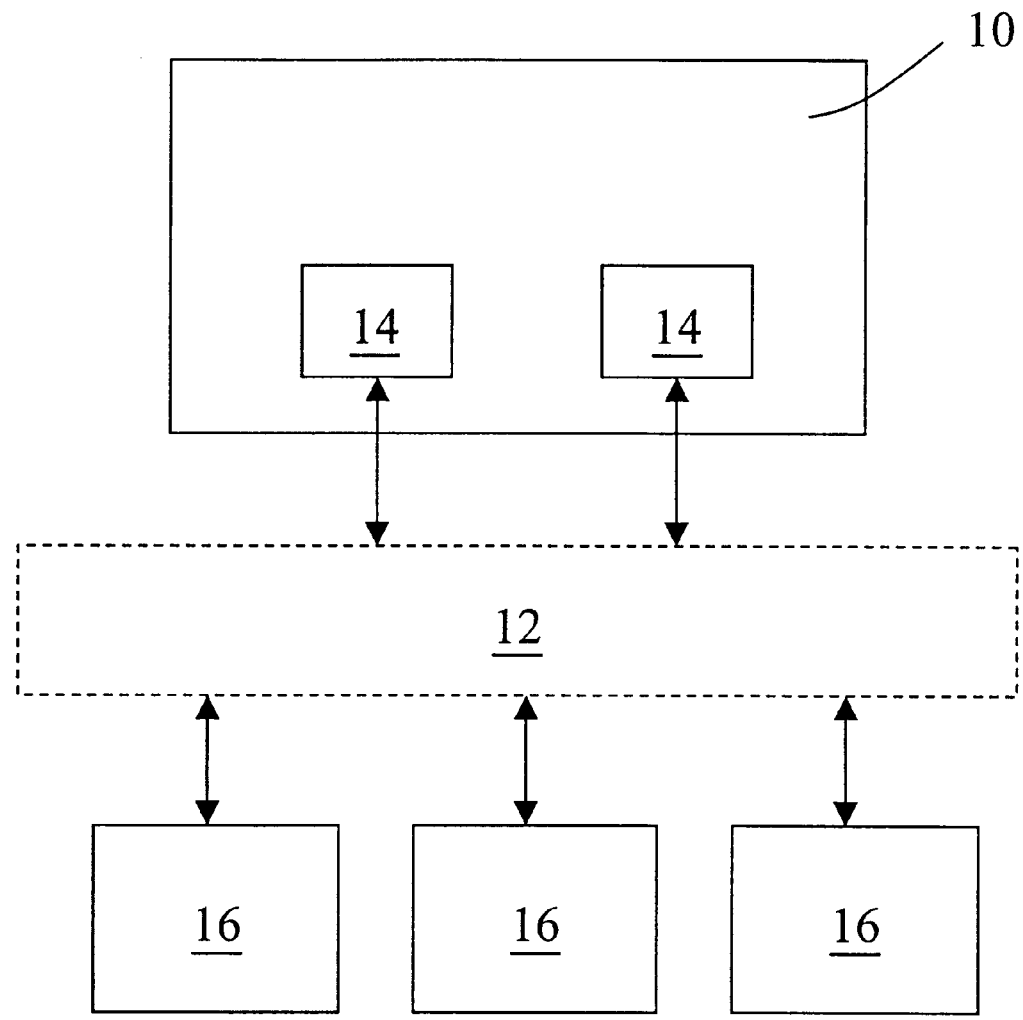
FIG. 1 is a block diagram of a distributed computer system.

FIG. 1 is a schematic diagram of a distributed computer system incorporating the invention. The system includes a host computer 10 coupled to a low bandwidth transport system 12 (e.g., a serial lines, telephone lines, a local area network or a wide area network). The application servers 14 provides application execution services to network user workstations 16. When a user workstation wishes to run an application, the application server intercepts the user's interface (e.g., the display screen, keyboard, and mouse) data and transmits/receives this data to/from a user program running at the user's workstation.

For applications involving graphical lines, the application server intercepts the graphical user interface and interacts with the user program to display lines on a display at the user's workstation. Such lines may be in various forms including: straight, arcs, ellipses, or bezier curves. In accordance with the present invention, the application server takes any graphical line and its attributes (e.g., color, position, orientation, and length) and compresses that information into a much smaller format. This compression method is essential in a distributed computer system, where graphical line data is transmitted across low bandwidth communication transports.

The compression method of the present invention works for any lines and any line attributes. When graphical lines are compressed in accordance with the invention, they can easily be decompressed by a decompression program in each user workstation to their original form without any loss of information. In addition, the decompression program does not require any additional knowledge.

FIG. 2 is a flow chart illustrating the basic graphical line compression method of the present invention. When a user workstation initiates an application which requires a graphical line, the application server intercepts the graphical line data from the host computer (step 20). The application server determines, from the graphical line data, coordinate locations for the endpoints of each sub-path of the entire path (i.e., the graphical line) (step 22). The application also determines the attributes of each sub-path from the graphical line data (step 24). The application server represents the coordinate locations and the attributes as compressed data of variable length (step 26). The application server then generates a compressed line data packet of variable length which includes said compressed coordinate location data and said compressed attribute data for each sub-path (step 28). The data packet generated by the application server fully defines the characteristics of the graphical line. The length of the data packet varies depending upon the number of sub-paths and the number and complexity of the attributes for each sub-path.

Referring to FIG. 3, the data packet is transmitted over a low bandwidth communication transport mechanism and received by a decompression program within the workstation (step 30). The program determines the graphical line data (i.e., coordinate locations for the endpoints of each sub-path of the graphical line and attributes of each sub-path) by decompression of the variable length compressed line data packet (step 32). The graphical user interface uses the decompressed graphical lines data to display the graphical line on the display screen of the workstation (step 34).

Figure 4A:
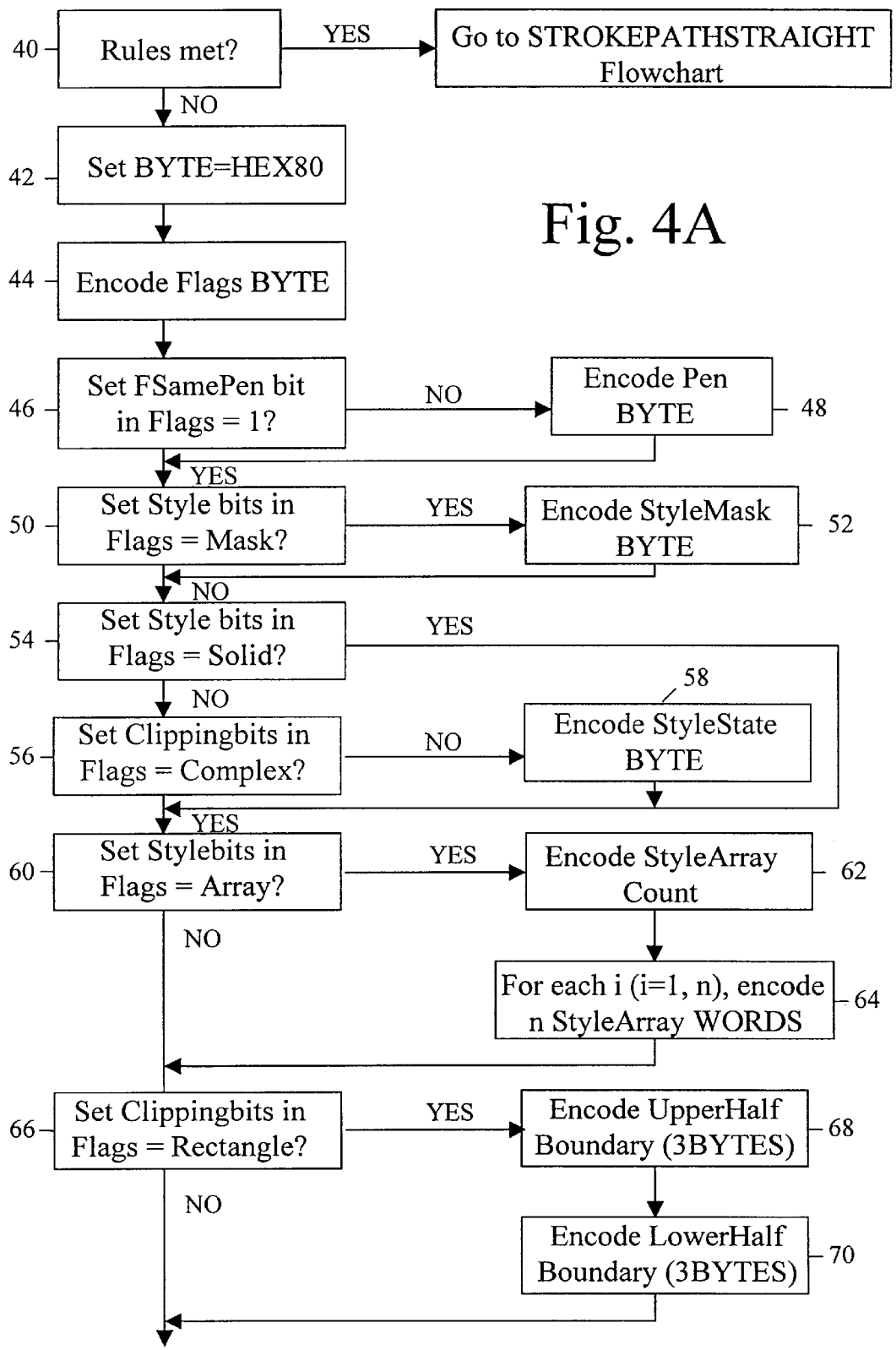
FIGS. 4A and 4B are detailed flow charts illustrating that portion of the graphical line compression method of the invention pertaining to curved and complex non-curved lines.
Figure 4B:
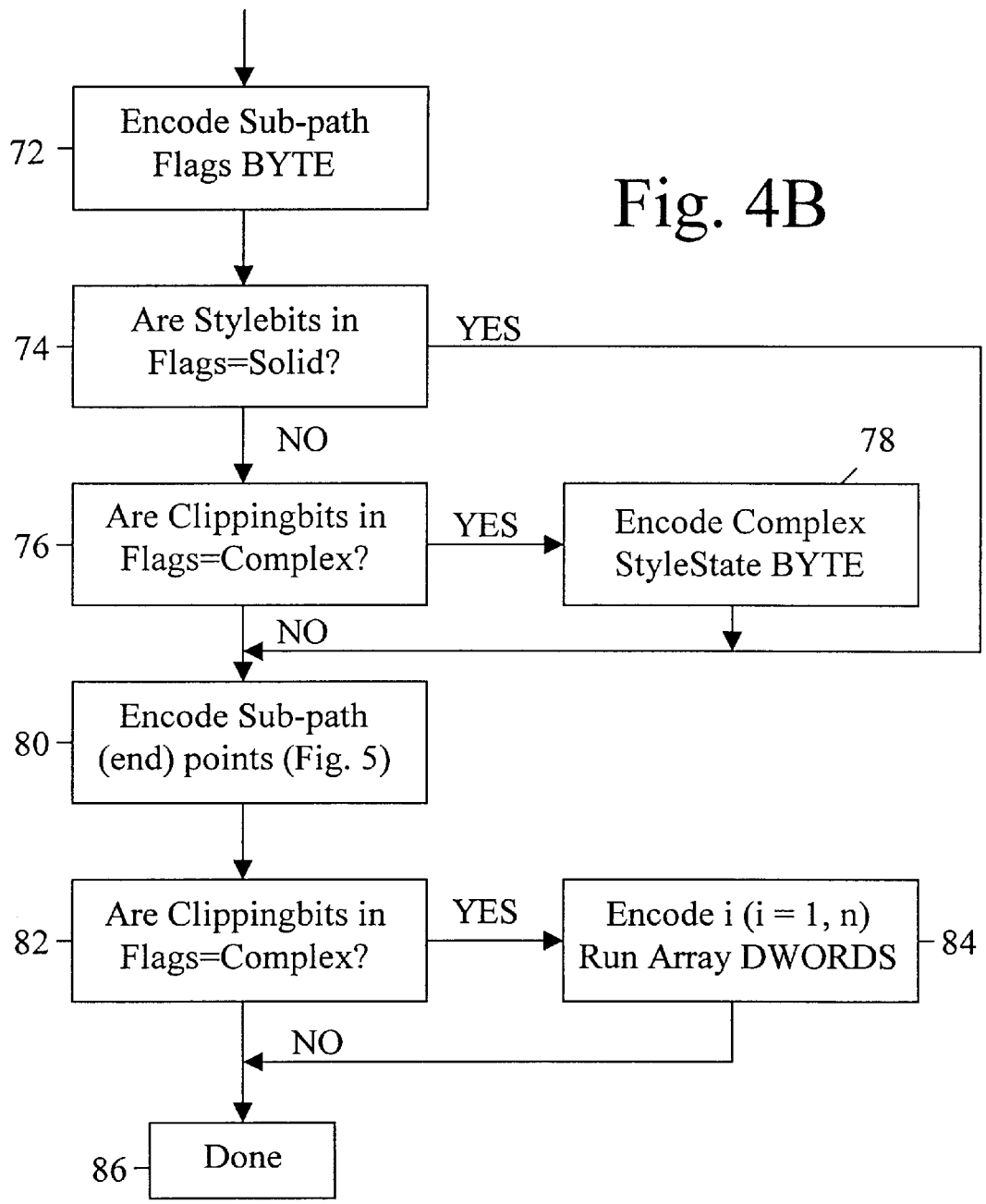

FIGS. 4A and 4B are detailed flow charts illustrating that portion of the graphical line compression method of the invention pertaining to curved and complex non-curved lines. The term "path" (or "line") includes the attributes and endpoint data required for a complete line compression operation. Every path is comprised of one or more sub-paths, and a sub-path is a set of points which constitutes a logical subsection of a line.

This flow chart is implemented for all line compression operations except for those which meet the STROKEPATH-STRAIGHT rules (step 40). Only simple, non-curved lines meet these rules, which are set forth in detail in the Line Drawing Operation Protocol section. Once it has been determined that the line is not simple and non-curved, the first BYTE is set to 80 (Hex) to identify the protocol as STROKEPATH (step 42).

Next, the Flags BYTE is encoded (step 44). The Flags BYTE is applicable for all sub-paths in the line and includes attribute/pointer information (e.g., clipping, style, gap and color) for the line. If the color of the line is the same as the previous line compression operation, the fSamePen bit (b6) is set to ONE (step 46). If the color is different, the Pen BYTE is encoded (step 48). If the line has a mask-defined style, the Style bits (b2–b4) are set to Mask (step 50) and the Style Mask BYTE is encoded (step 52). If the line is solid, the Style bits are set to Solid (step 54) and steps 56 and 58 are skipped. If the line is not solid and the line is clipped in a non-trivial manner, the Clipping bits (b0–b1) are set to Complex (step 56). If, however, the line is not solid and is not clipped in a non-trivial manner, the Style State BYTE is encoded (step 58).

If the line has an array-defined style, the Style bits are set to Array (step 60) and the Style Array Count BYTE and n Style Array WORDS are encoded (step 62). The Style Array Count is the number of elements submitted in the Style Array. The Style Array consists of n WORDS, where n is the value of the Style Array Count. If the line is clipped to a single rectangle, the Clipping bits arc set to Rectangle (step 66) and the Upper Half Boundary (3 BYTES) and Lower Half Boundary (3 BYTES) of the rectangle are encoded (steps 68, 70).

Next, the Sub-path Flags BYTE is encoded (step 72). This BYTE is applicable to the proceeding sub-path only and prior to the set of sub-path endpoints. If the Style bits in the Flags BYTE are set to solid (step 74), steps 76 and 78 are skipped. If the line is not solid and the Clipping bits in the Flags BYTE are set to Complex (step 76), the Complex Style State BYTE is encoded (step 76).

The Sub-path endpoints are then encoded (step 80) and explained in detail below. If the Clipping bits in the Flags BYTE are set to Complex (step 82), then a Run Array of n DWORDS are encoded (step 84) and the compression operation is complete (step 86).

Figure 5:
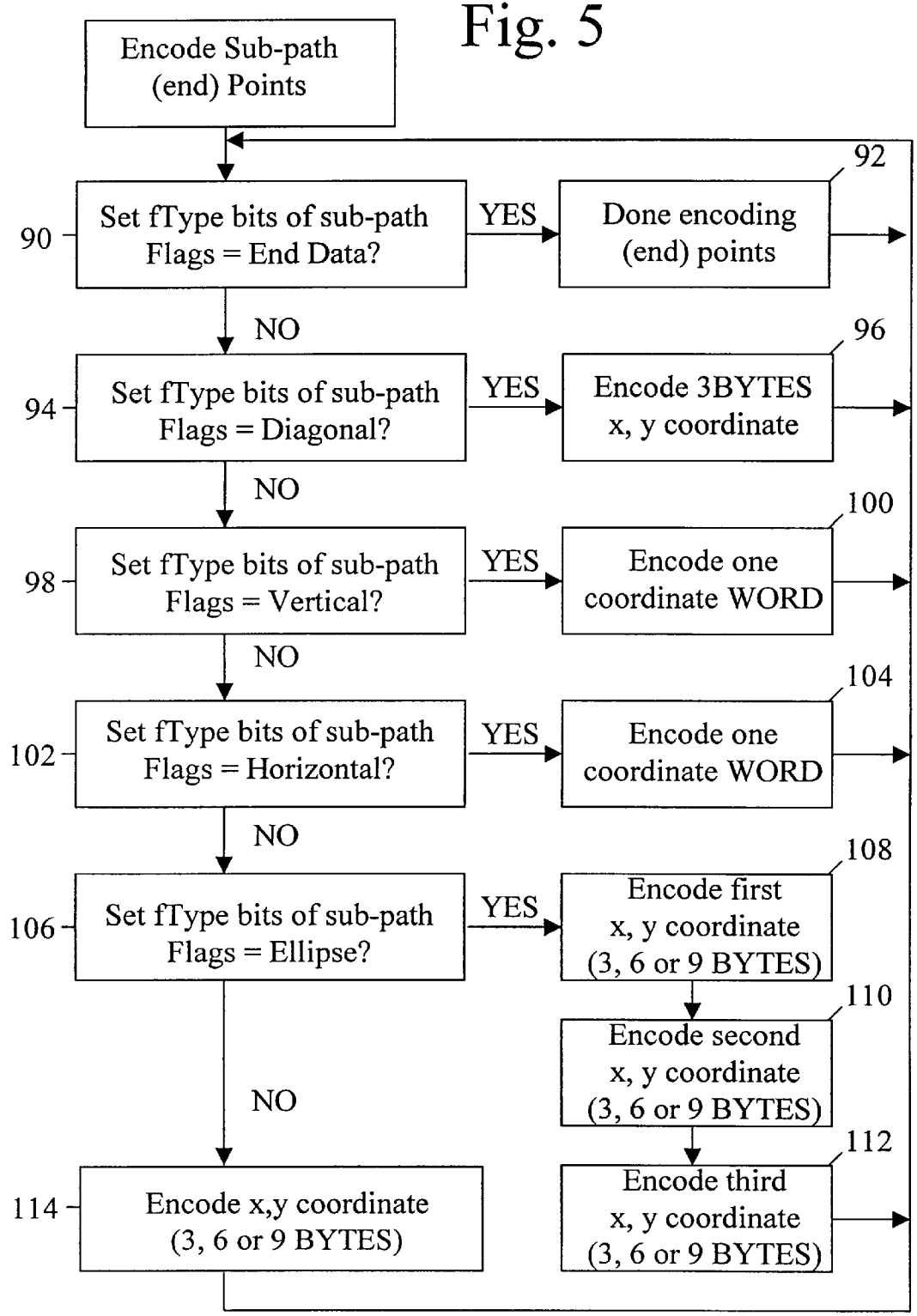
FIG. 5 is a flow chart illustrating that portion of the graphical line compression method of the invention pertaining to compressing endpoints.

FIG. 5 is a flow chart illustrating that portion of the graphical line compression method of the invention pertaining to the compression of endpoints. If there is no more endpoint data for the line, the fType bits (b5–b7) of the Sub-path Flags BYTE are set to EndData (step 90) and the endpoint encoding process is complete (step 92). If the proceeding set of sub-path endpoints define a diagonal line, the fType bits are set to Diagonal (step 94) and a 3 BYTE (x,y) coordinate is encoded (step 96). If the proceeding set of sub-path endpoints define a vertical line, the fType bits are set to Vertical (step 98) and a one WORD coordinate is encoded (step 100). If the proceeding set of sub-path endpoints define a horizontal line, the fType bits are set to Horizontal (step 102) and a one WORD coordinate is encoded (step 104). If the proceeding set of sub-path endpoints define an ellipse, the fType bits are set to Ellipse (step 106) and a three (x,y) coordinates (3, 6 or 9 BYTES each) are encoded (steps 108–112). If the sub-path endpoints define a normal line, the fType bits are set to Normal and an (x,y) coordinate (3, 6 or 9 BYTES) is encoded (step 114). This process is repeated until all endpoints have been encoded.

Figure 6:
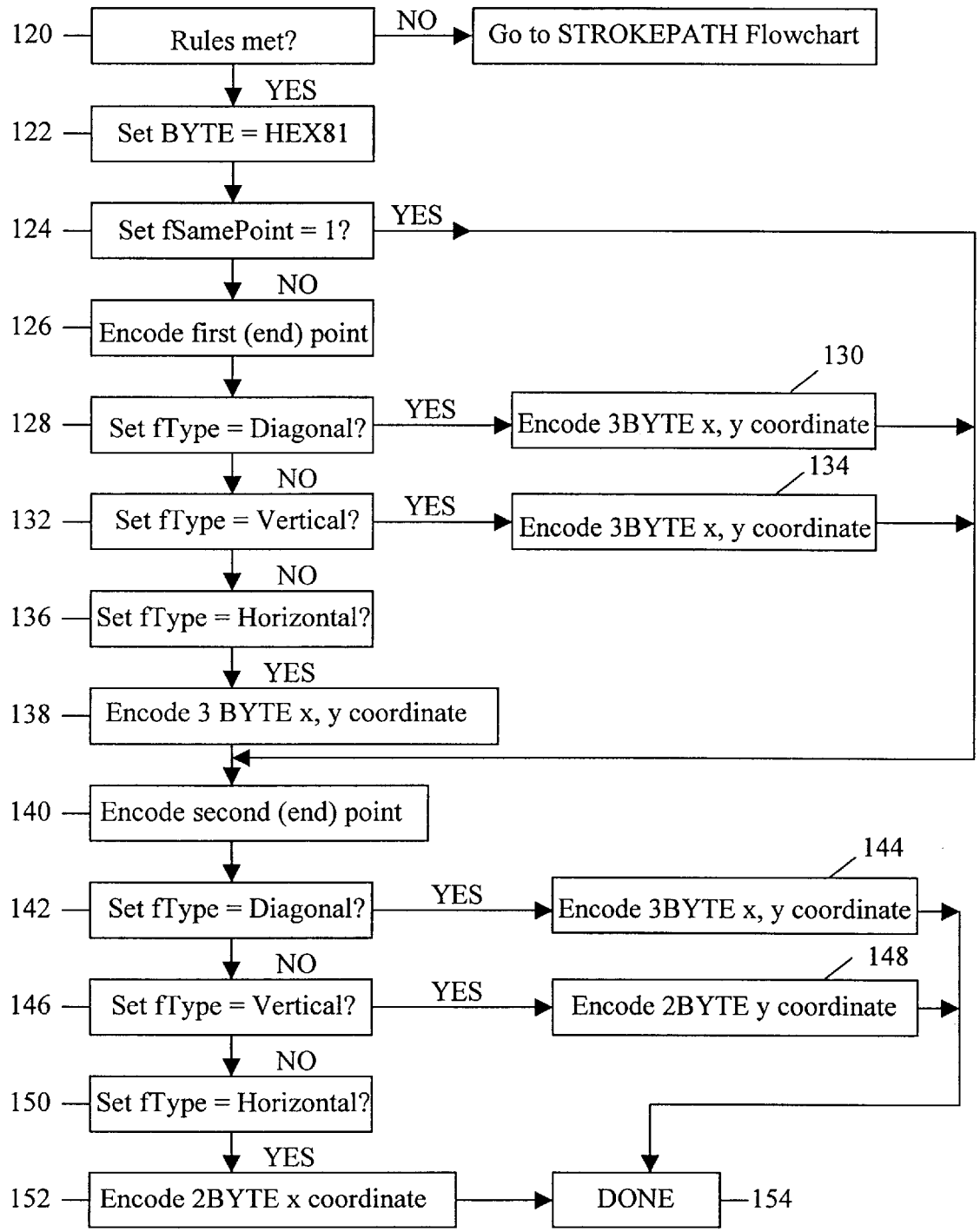
FIG. 6 is a detailed flow chart illustrating that portion of the graphical line compression method of the invention pertaining to simple non-curved lines.

FIG. 6 is a detailed flow chart illustrating that portion of the graphical line compression method of the invention pertaining to simple, non-curved lines. This flow chart is implemented only for line compression operations which meet the STROKEPATHSTRAIGHT rules (step 120). Only simple, non-curved lines meet these rules. Once it has been determined that the line is simple and non-curved, the first BYTE is set to 81 (Hex) to identify the protocol as STROKEPATHSTRAIGHT (step 122).

There are always two endpoints in the line to be encoded. If the first point is the same as the last point of the previous line, fSamePoint is set to ONE (step 124) and only the second point is encoded (see steps 140–154). If not, fSamePoint is set to ZERO and the first point is encoded (step 124). If the first point is part of a diagonal line, the fType bits are set to Diagonal (step 128) and a 3 BYTE (x,y) coordinate is encoded (step 130). If the first point is part of a vertical line, the fType bits are set to Vertical (step 132) and 3 BYTE (x,y) coordinate is encoded (step 134). If the first point is part of a horizontal line, the fType bits are set to Horizontal (step 136) and 3 BYTE (x,y) coordinate is encoded (step 138).

Next, the second endpoint is encoded (step 140). If the second point is part of a diagonal line, the fType bits are set to Diagonal (step 142) and a 3 BYTE (x,y) coordinate is encoded (step 144). If the second point is part of a vertical line, the fType bits are set to Vertical (step 146) and 2 BYTE (y) coordinate is encoded (step 148). If the second point is part of a horizontal line, the fType bits are set to Horizontal (step 150) and 2 BYTE (x) coordinate is encoded (step 152) and the process is complete (step 154).

Line Drawing Operation Protocol

A detailed description of the STROKEPATH and STROKEPATHSTRAIGHT protocol taken from form the Citrix ICA 3.0 Thin Wire Addendum—Revision 0.3 is provided below.

STROKEPATH and STROKEPATHSTRAIGHT Protocol

I. STROKEPATH

For the following description of line drawing support, the term path is used to denote all of the characteristics and points of a complete STROKEPATH or STROKEPATHSTRAIGHT line drawing operation. Every path is comprised of one or more sub-paths. A sub-path is a set of points which constitutes a logical sub-section of the complete line drawing operation.

The coordinates sent to the client are a compress format of Microsoft's 28.4 fixed point format. The client uses these points to draw lines using Microsoft's run slice algorithm, as shown in the Microsoft Windows NT DDK VGA driver sample. The referenced 28.4 fixed point format, run slice program, and Windows NT DDK VGA driver are products of Microsoft Corporation, of Redmond, Wash.

This packet is used for all line drawing operations except for those which meet the STROKEPATHSTRAIGHT packet criteria. That is, all line drawing operations which not satisfy all of the following criteria:

Path consists of one and only one sub-path
Sub-path consists of only two points
Path uses the same pen (color & ROP2) as the last drawing operation
Line is solid
No clipping (not even simple rect clipping)
First point is either an integer or the same as the last point of the last drawing operation
Second point is an integer Protocol All multi-byte data entities used in STROKEPATH are submitted in order, from least significant byte to most significant byte.

The following constitutes the data stream for the STROKEPATH command packet:

```
BYTE   0x80 (STROKEPATH)                          always submitted
BYTE   Flags (applicable to all sub-paths)        always submitted
 • Clipping (2 bits)
                             b1  b0
   Trivial:                  0   0  - Clipping need not be considered;
                                      draw the whole figure.
   Rectangle:                0   1  - Clip to a single rectangle
   Complex:                  1   0  - The line is clipped in a non-trivial
                                      manner.
                             1   1  - reserved
   Remarks:
     Rectangle -             for this type of clipping, a boundary rectangle
                             is submitted as part of the data stream (see
                             Boundary rectangle below).
     Complex -               for this type of clipping, a run array is submit-
                             ted as part of the data stream (see Run array
                             below).
 • Style (3 bits)
                             b4  b3  b2
   Solid:                    0   0   0  - Line is solid.
   Alternate:                0   0   1  - Line is drawn with every other
                                          pixel displayed.
   Dash:                     0   1   0  - Line is drawn with dash style.
   Dot:                      0   1   1  - Line is drawn with dot style.
   DashDot:                  1   0   0  - Line is drawn with dash-dot
                                          style.
   DashDotDot:               1   0   1  - Line is drawn with dash-dot-
                                          dot style.
   Mask:                     1   1   0  - Line is drawn with a bit mask-
                                          defined style.
   Array:                    1   1   1  - Line is drawn with an array-
                                          defined style.
   Remarks:
     Dash -                  For this line style, the 8-bit style mask,
                             11001100, is to be used. See style mask,
                             below, for a description of style masks.
     Dot -                   For this line style, the 8-bit style mask,
                             10101010, is to be used.
     DashDot -               For this line style, the 8-bit style mask,
                             11100100, is to be used.
     DashDotDot -            For this line style, the 8-bit style mask,
                             11101010, is to be used.
     Mask -                  For this line style, an 8-bit style mask is
                             submitted as part of the data stream (see style
                             mask below).
     Array -                 For this line style, a style array is submitted as
                             part of the data stream (see style array below).
 • fStartGap (1 bit)
                             b5
   False:                    0 - The style does not begin with a gap.
   True:                     1 - The style begins with a gap.
   Style Mask -              If fStartGap is True, the 1's in the style mask
                             represent gaps, otherwise, the 0's represent
                             gaps. See style mask, below, for a description
                             of style masks.
   Style Array -             If fStartGap is True, the first entry in the style
                             array specifies the length of the first gap,
                             otherwise, the second entry in the style array
                             specifies the length of the first gap. See style
                             array, below, for a description of style arrays.
 • fSamePen (1 bit)
                             b6
   False:                    0 - The color and/or ROP is different from
                                 the last line draw operation.
   True:                     1 - The color and ROP is the same as in the
                                 last line draw operation.
   Remarks:                  If fSamePen is False a pen is submitted
                             as part of the data stream (see pen below).
 • reserved (1 bit)
                             b7
                             0 - reserved.
                             0 - reserved.
                             1  0 - The line is clipped in a non-trivial manner.
                             1  1 - reserved
BYTE Pen (applicable to all sub-paths)   submitted only if
                                         Flags.fSamePen is False
 • Raster operation [ROP2] (4 bits)
                             b3  b2  b1  b0
   White:                    0   0   0   0  - 1
```

-continued

| | | b7 | b6 | b5 | b4 | | |
|---|---|---|---|---|---|---|---|
| Black: | | 0 | 0 | 0 | 1 | - | 0 |
| NotMergePen: | | 0 | 0 | 1 | 0 | - | DPon |
| MaskNotPen: | | 0 | 0 | 1 | 1 | - | DPna |
| NotCopyPen: | | 0 | 1 | 0 | 0 | - | PN |
| MaskPenNot: | | 0 | 1 | 0 | 1 | - | PDna |
| Not: | | 0 | 1 | 1 | 0 | - | Dn |
| XOrPen: | | 0 | 1 | 1 | 1 | - | DPx |
| NotMaskPen: | | 1 | 0 | 0 | 0 | - | DPan |
| MaskPen: | | 1 | 0 | 0 | 1 | - | DPa |
| NotXOrPen: | | 1 | 0 | 1 | 0 | - | DPxn |
| Nop: | | 1 | 0 | 1 | 1 | - | D |
| MergePenNot: | | 1 | 1 | 0 | 0 | - | DPno |
| CopyPen: | | 1 | 1 | 0 | 1 | - | P |
| MergePenNot: | | 1 | 1 | 1 | 0 | - | PDno |
| MergePen: | | 1 | 1 | 1 | 1 | - | Dpo |

- Color (4 bits)

| | b7 | b6 | b5 | b4 |
|---|---|---|---|---|
| Color: | x | x | x | x |

Remarks: The pen is included in the data stream if and only if the fSamePenvalue of the Flags byte is False. If fSamePen is True, the same color and raster operation specified by the pen submitted in the last line drawing operation is to be used.

BYTE Style Mask submitted only if Flags.Style is (applicable to all sub-paths) Mask Remarks: The style mask is included in the data stream if and only if the Style value of the Flags byte is Mask. If Style is a value other than Mask, this byte is not sent.
The style mask is 8 bits long (b7–b0), where each bit represents one device unit length of line or gap. Typically, a bit setting of 0 represents a gap, but if the fStartGap value of the Flags byte is True, then a 1 represents a gap.

BYTE Style State submitted only if Flags.Style is (applicable to all sub-paths) not Solid, and Flags.Clipping is not Complex Remarks: The style state is included in the data stream if and only if the Style value of the Flags byte is not Solid and the Clipping value of the Flags byte is not Complex. If either of these conditions are not met, this data is not sent. The style state is a measure of where in the styling array to start the first sub-path.

BYTE Style Array count submitted only if Flags.Style is (applicable to all sub-paths) Array Remarks: The style array count is included in the data stream if and only if the Style value of the Flags byte is Array. If Style is a value other than Array, this byte is not sent.
The style array count is the number of elements submitted in the proceeding style array (see style array, below, for a description of style arrays).

n WORDS Style Array (applicable to all sub-paths) submitted only if
is the style array count. Flags.Style where n is Array Remarks: The style array is included in the data stream if and only if the Style value of the Flags byte is Array. If Style is a value other than Array, this byte is not sent.
The style array consists of n WORDS, where n is the value of style array count. The first WORD in the array specifies the length of the first dash, the second specifies the length of the first gap, and so on.

4 6 BYTES Boundary rectangle (applicable to all sub-paths) submitted only if Flags.Clipping is Rectangle The boundary rectangle is submitted as a three byte upper left hand point followed by a 1–3 byte

- Upper left hand point (3 BYTES - 24 bits)
  - fType (3 bits)

-continued

| | b2 | b1 | b0 | Type of X and Y delta which follows |
|---|---|---|---|---|
| 3dx5dy: | 0 | 0 | 0 | 3-bit X delta, 5-bit Y delta (1BYTE). |
| 5dx3dy: | 0 | 0 | 1 | 5-bit X delta, 3-bit Y delta (1BYTE) |
| 11dx5dy: | 0 | 1 | 0 | 11-bit X delta, 5-bit Y delta (2 BYTES) |
| 11dx10dy: | 0 | 1 | 1 | 11-bit X delta, 10-bit Y delta (3 BYTES) |
| 4dx4dy: | 1 | 0 | 0 | 4-bit X delta, 4-bit Y delta (1 BYTE) |
| 10dx6dy: | 1 | 0 | 1 | 10-bit X delta, 6-bit Y delta (2 BYTES) |
| 6dx10dy: | 1 | 1 | 0 | 6-bit X delta, 10-bit delta (2 BYTES) |
| 8dx8dy: | 1 | 1 | 1 | 8-bit X delta, 8-bit Y delta (2 BYTES) |

Remarks: The value of fType indicates how many bytes follow which constitute the lower right hand X and Y coordinate deltas.

- X coordinate (11 bits)
  b13–b3
  x         -integer value of X coordinate
- Y coordinate (10 bits)
  b23–b14
  y         -integer value of Y coordinate
- Lower right hand X and Y delta
  3dx5dy:(1 BYTE)
  - X coordinate delta (3 bits) b2–b0
  - Y coordinate delta (5 bits) b7–b3
  4dx4dy:(1BYTE)
  - X coordinate delta (4 bits) b3–b0
  - Y coordinate delta (4 bits) b7–b4
  5dx3dy:(1 BYTE
  - X coordinate delta (5 bits) b4–b0
  - Y coordinate delta (3 bits) b7–b5
  6dx10dy:(2 BYTES)
  - X coordinate delta (6 bits) b5–b0
  - Y coordinate delta (10 bits) b15–b6
  8dx8dy:(2 BYTES)
  - X coordinate delta (8 bits) b7–b0
  - Y coordinate delta (6 bits) b15–b8
  10dx6dy:(2 BYTES)
  - X coordinate delta (10 bits) b9–b0
  - Y coordinate delta (6 bits) b15–b10
  11dx5dy:(2 BYTES)
  - X coordinate delta (11 bits) b10–b0
  - Y coordinate delta (5 bits) b15–b11
  11dx10dy:(3 BYTES)
  - X coordinate delta (11 bits) b10–b0
  - Y coordinate delta (10 bits) b20–b11
  - reserved (3 bits) b23–b21

Remarks:

The boundary rectangle is included in the data stream if and only if the Clipping value of the Flags byte is Rectangle. If Clipping has a value other than Rectangle, this data is not sent.

The lower right hand coordinate is sent as 0-based 1. If (x1, y1) is the UHL coordinate and (x2,y2) is the LRH coordinate and (dx,dy) are the LRH deltas, then x2=x1+dx+1 and y2=y1+dy+1.

The boundary rectangle is used to clip the path. Any portions of the line which fall outside this boundary should not be drawn.

BYTE Sub-path Flags (applicable to the proceeding sub-path only) always submitted.

The sub-path flags byte is submitted prior to the set of sub-path points.

- fLast (1 bit)
  b0
  False: 0 - There is another sub-path following the proceeding sub-path.
  True: 1 - The proceeding sub-path is the last in the path.
  Remarks:
  True - If fLast is True, no more data will be sent after the proceeding set of subpath points.
  False If fLast is False, following the preceeding set of sub-path points, another sub-path flags byte and another set of sub-path points will be sent.
- fSamePoint (1 bit)
  b1
  False: 0-The first sub-path point is sent in the proceeding set of sub-path points.
  True: 1-The first point is not sent; the last point should be used as the first
  Remarks:
  True: If fSamePoint is True, the first point of the sub-path will not be included in the proceeding set of sub-path points. Instead, the last point submitted in the last set of sub-path points will be used as the first point of the proceeding sub-path. The last point can be from the same or a different path.
  False: If fSamePoint is False, the proceeding set of sub-path points, will include the first point in the sub-path.
- fBezier (1 bit)
  b2
  False: 0-The proceeding set of sub-path points do not define a Bezier curve.
  True: 1-The proceeding set of sub-path points define a Bezier curve.
  Remarks:
  fBezier will always be False if the client does not support the GCAPS_COMPLEX_CURVES capability.
  True: If fBezier is True, the proceeding set of sub-path points will define either a Bezier curve or an ellipse variation. See fType, below, for information on determining the Bezier type. See Bezier Format, below, for a description of the Bezier format.
  False: if fBezier is False, the proceeding set of sub-path points will consist of a set of points to be connected to form a line.
- fClosed (1 bit)
  b3
  False: 0-The proceeding set of sub-path points do not define a closed figure.
  True: 1-The proceeding set of sub-path points define closed figure.
  Remarks:
  True: If fClosed is True, the first point in the sub-path which had the fNewStart bit set should be used also as the last point, in order to draw a closed figure.
  False: If fClosed is False, the last point of the sub-path is included in the proceeding set of sub-path points.
- fNewStart (1 bit)
  b4
  False: 0-The proceeding set of sub-path points are a figure continuation.
  True: 1-The proceeding set of sub-path points define a start of a new figure.
  Remarks:
  True: If fNewStart is True, the first point in the proceeding sub-path should be considered the start of a new figure and used as the last point if the fClosed bit is set.
  False: If fNewStart is False, the proceeding set of sub-path points is a continuation of the previous subpath and does not constitute the start of a new closed figure.
- fType (3 bits)
  b7 b6 b5
  Normal: 0 0 0-The proceeding set of sub-path points define a normal line.
  Horizontal: 0 0 1-The proceeding set of sub-path points define a horizontal line.
  Vertical: 0 1 0-The proceeding set of sub-path points define a vertical line.
  Diagonal: 0 1 1-The proceeding set of sub-path points define a diagonal line.
  Ellipse: 1 0 0-The proceeding set of sub-path points define an ellipse.
  1 0 1-reserved.
  1 1 0-reserved.
  EndData: 1 1 1-There is no more data to be processed for this path.
  Remarks:
  Normal - If fType is Normal, all points will be sent in the proceeding set of sub-path points. See sub-path points, below, for a description of point formats.
  Horizontal - If fType is Horizontal, the first point will be sent in the proceeding set of sub-path points. Only the X coordinate of the second point will be sent next, and will be in the one coordinate format. See the remarks, below, on the one coordinate format for more information. Note that the first point will not be sent if the fSamePoint value of the sub-points flags byte is True.
  Vertical - If fType is Vertical, the first point will be sent in the proceeding set of sub-path points. Only the Y coordinate of the second point will be sent next, and will be in the one coordinate format. See the remarks, below, on the one coordinate format for more information. Note that the first point will not be sent if the fSamePoint value of the sub-points flags byte is True.
  Diagonal - If fType is Diagonal, the proceeding set of sub-path points define a diagonal line consisting of only two points. See the sub-path points, below, for a description of point formats.
  Ellipse - If fType is Ellipse, the proceeding set of sub-path points define an ellipse. See the Ellipse format, below, for more information on this format.
  EndData - if fType is EndData, another set of sub-path points will not be sent. The last sub-path set is considered the last sub-path in the path.
  BYTE Complex Style State (applicable to this sub-path only)
  submitted only if Flags.Style is not Solid, and Flags.Clipping is Complex Remarks:
The complex style state is included in the data stream if and only if the Style value of the Flags byte is not Solid and the Clipping value of the Flags byte is Complex. If either of these conditions are not met, this data is not sent.

The complex style state is a measure of where in the styling array to start the sub-path.

This BYTE is sent for each subpath with complex clipping, after the sub-path flags and prior to the set of sub-path points.

2, 3, 4, or 9 BYTES (per point) Sub-path points    always submitted
(depending upon point forward - see below)

The sub-path points data consists of one or more points in any of the standard formats, the Bezier format, the ellipse format, or the one coordinate format. The last point in the set is determined by the flast bit (see below).
Standard formats (24, 32, or 72 bits)
The point, or (x,y) coordinate, is submitted as either 3, 4 or 4 BYTES, depending upon whether or not the X and/or Y coordinate contains a fractional components and/or is a negative value. The least significant three bits of each point are flags which are common for each the signed and unsigned, integer and rational formats.

- fSigned (1 bit)
  b0
  False: 0-Both x and y are unsigned values.
  True: 1-Both x and y are signed values.

Remarks:
True: If fSigned is True, this point is in either the 4 BYTE signed integer format, or the 9 BYTE signed rational format.
False: If fSigned is False, this point is in either the 3 BYTE unsigned integer format, or the 4 BYTE unsigned rational format.
• fInteger (1 bit)
  b1
False: 0-Both x and y are rational values.
True: 1-Both x and y are integer values.
Remarks:
True: if fInteger is True, this point is in either the 3 BYTE unsigned integer format, or the 4 BYTE signed integer format.
False: if fInteger is False, this point is in either the 4 BYTE unsigned rationalformat, or the 9 BYTE signed rational format.
• fLast (1 bit)
  b2
False: 0 - There is another point following this point.
True: 1 - This is the last point in the subpath.
Remarks:
True - If fLast is True, this point is the last in this sub-path.
False - If fLast is False, following this point, another point will be sent.
• Unsigned integer format
  • X coordinate (11 bits)
    b13–b3
      x  -unsigned integer value of X coordinate.
  • Y coordinate (10 bits)
    b23–b14
      y  -unsigned integer value of Y coordinate.

Remarks:

The unsigned integer format is submitted if fSigned is False and fInteger is True.

Points in this format total 3 BYTES.

• Unsigned integer format
  • X coordinate (15 bits)
    b17–b3
      x  -unsigned FIX value of X coordinate.
  • Y coordinate (14 bits)
    b31–b18
      y  -unsigned FIX value of Y coordinate.

Remarks:

The unsigned rational format is submitted if fsigned is False and fInteger is False.

Points in this format total 4 BYTES.

• Signed integer format
  • X coordinate (15 bits)
    b17–b3
      x  -signed integer value of X coordinate.
  • Y coordinate (14 bits)
    b31–b18
      y  -signed integer value of Y coordinate.

Remarks:
The signed integer format is submitted if fSigned is True and fInteger is True.
Points in this format total 4 BYTES.

• Signed rational format
  • reserved (5 bits)
    b7–b3
      res -reserved for future use.
  • X coordinate (32 bits)
    b39–b8
      x  -signed FIX value of X coordinate.
  • Y coordinate (32 bits)
    b71–b40
      y  -signed FIX value of Y coordinate.

Remarks:
The signed rational format is submitted if fSigned is True and fInteger is False.
Points in this format total 9 BYTES.
Remarks:
FIX—With the FIX format for rational format coordinates, the least significant 4 bits of the coordinate denote the fractional component, while the remaining bits denote the integer component. The 4-bit fractional component represents the number of sixteenths of a unit.
The fractional component may be zero.
Bezier format
The Bezier format of sub-path points is used if the fBezier value of the sub-path flags byte is True and the fType value of the sub-path flags byte is Normal. If the ftype value is Ellipse, then the ellipse format is sent instead.
For the Bezier format, all points are sent in the standard format, where each point is in either the signed or unsigned, integer or rational formats. For a Bezier sub-path, the fSamePoint value of the sub-path flags byte still applies.
The data in this format consists of the end points and control points of the spline(s). The number of points in the sub-path is one more than three times the number of splines to be drawn (because each Bezier spline requires two control points and an endpoint, and the initial spline requires a starting point).
Remarks:
The cubic Bezier spline is drawn using the end points and control points specified by the set of sub-path points. The first spline is drawn from the first point to the fourth point by using the second and third points as control points. Each subsequent spline in the sequence needs exactly three more points: the ending point of the previous spline is used as the starting point, the next two points in the sequence are control points, and the third is the ending point.
Ellipse format
The ellipse format is a special condensed variation of four bezier curves used to draw a circle or an ellipse. The format consists of three points:
FirstPoint (3, 4, or 9 BYTES) in standard signed or unsigned, integer or rational format. This point is not sent if fSamePoint of sub-path flags is True.
SecondPoint (3, 4, or 9 BYTES) in standard signed or unsigned, integer or rational format.
ThirdPoint (3, 4, or 9 BYTES) in standard signed or unsigned, integer or rational format.
Remarks:
The ellipse format will never be used if the $GCAPS_{13}$ COMPLEX_CURVES capability is not supported by the client.
The ellipse format can be easily expanded into a 13 point Bezier format using the following algorithm:

```
    FIX ptBez[13]
    FIX xLeft, xRight, yTop, yBottom
    FIX xBez2, yBez1
    FIX Ax, By, Cx, Dy
      xLeft      = X coordinate of first point
      yTop       = Y coordinate of first point
      xRight     = X coordinate of second point
      yBottom    = Y coordinate of second point
      XBez2      = X coordinate of third point
      yBez1      = Y coordinate of third point
      Ax = (xRight - xLeft)/2
      By = (yTop - yBottom)/2
      Cx = xRight - xBez2
      Dy = yTop - yBez1
      ptBez[0].x = xRight
      ptBez[0].y = yBottom + By
      ptBez[1].x = xRight
      ptBez[1].y = yBez1
      ptBez[2].x = xBez2
      ptBez[2].y = yTop
      ptBez[3].x = xRight - Ax
      ptBez[3].y = yTop
      ptBez[4].x = xLeft + Cx
      ptBez[4].y = yTop
      ptBez[5].x = xLeft
      ptBez[5].y = yTop - Dy
      ptBez[6].x = xLeft
      ptBez[6].y = yTop - By
      ptBez[7].x = xLeft
      ptBez[7].y = yBottom + Dy
      ptBez[8].x = xLeft + Cx
      ptBez[8].y = yBottom
      ptBez[9].x = xLeft + Ax
      ptBez[9]y = yBottom
      ptBez[10].x = xRight - Cx
      ptBez[10].y = yBottom
      ptBez[11].x = xRight
      ptBez[11].y = yBottom + Dy
      ptBez[12].x = xRight
      ptBez[12].y = yBottom + By
 •  one coordinate format (1 WORD)
      b15-b0
        f     - Value of X or Y coordinate in FIX format.
```

Remarks:

The one coordinate format is used if the fType value of the sub-path flags byte is either Horizontal or Vertical. If fType is Horizontal, the value sent will be the X coordinate of the second point of the line. The Y coordinate will not be sent since it is the same as the Y coordinate of the first point.

If fType is Vertical, the value sent will be the Y coordinate of the second point of the line. The X coordinate will not be sent since it is the same as the X coordinate of the first point.

Since horizontal and vertical lines are always only two points, the one coordinate value will always be the last data submitted in the sub-path.

Note that if the fSamePoint of the sub-path flags byte is True, the one coordinate value will be the only data in the sub-path.

```
n DWORDS Run Array    submitted only if Flags.Clipping is Complex
where n is the number of runs.
```

The run array data consists of one or more DWORD runs, each of which is comprised of some flags, a start position and a stop position. The last run in the array is determined by the fLast bit (see below).

```
 •  fLast (1 bit)
                 b0
      False:     0 - There is another DWORD run following this run.
      True:      1 - This is the last run in the subpath.
    Remarks:
      True -     If fLast is True, this run is the last in this sub-path.
      False -    If fLast is False, following this run, another run will
                 be sent.
 •  reserved (1 bit)
                 b1
                 0 - reserved
                 1 - reserved
 •  Start position (15 bits)
                 b16-b2
                    start   - start point for field of pizels to be
                              drawn.
 •  Stop position (15 bits)
                 b31-b17
                    stop    - stop point for field of pizels to be
                              drawn.
```

Remarks:

The run array is included in the data stream if and only if the Clipping value of the Flags byte is Complex. If Clippin is a value other than Complex, this data is not sent.

The first pixel of the unclipped line is pixel zero.

If Flags. Clipping is Complex, the set of sub-path points will always be limited to two points, which should be connected using the start and stop positions defined by the run array.

II. STROKEPATHSTRAIGHT

This packet is used for straight line drawing operations not handled by the STROKEPATH packet. That is, all line drawing operations which satisfy all of the following criteria:

Path consists of one and only one sub-path

Sub-path consists of only two points

Path uses the same pen (color & ROP2) as the last drawing operation

Line is solid

No clipping (not even simple rect clipping)

First point is either an unsigned integer or the same as the last point of the last drawing operation Second point is an unsigned integer Protocol Note: All multi-byte data entities used in STROKEPATH-STRAIGHT are submitted in order, from least significant byte to most significant byte.

| | |
|---|---|
| BYTE 0X81 (STOKEPATHSTRAIGHT) | always submitted |
| 2-6 BYTES points | always submitted |

There are always two points in the line to be drawn. If the least significant bit of the first byte sent, fSamePoint, is True, then that byte is part of the second (and last) point. If fSamePoint is False, then that byte is part of the first point, and the second point will immediately follow the first point.

The first point, if sent, is three bytes. The second point, which is always sent, is either two bytes or three bytes, depending upon whether just one coordinate of a horizontal or vertical line is sent.

All points sent, even the one coordinate variations, use a format where the three least significant bits or used as flags:

- fSamePoint (1 bit)
    b0
    False:   0 - This is the first point of the two-point line.
    True:    1 - The first point is not sent; the last point should be used as the first
    Remarks:
        True -  If fSamePoint is True, this is the second and last point of
                the line. The last point submitted in the last set of sub-path points will be used as the first point of this line.
        False - If fSamePoint is False, this is the first point of the two-point line. The last point is submitted next and will be two or three bytes, depending on the value of fType, below.
- fType (2 bits)
    b2 b1
    0 0 - reserved.
    Horizontal:  0 1 - This point is part of a horizontal line.
    Vertical:    1 0 - This point is part of a vertical line.
    Diagonal:    1 1 - This point is part of a diagonal line.
    Remarks:
        Diagonal -   If fType is Diagonal, the second point of the two-point line will be three bytes and will consist of both the X and Y coordinates in unsigned integer format.
        Horizontal - If fType is Horizontal, the second point of the two-point line will be two bytes and will consist of only the X coordinate in unsigned integer format. The Y coordinate of the second point is the same as the Y coordinate of the first point.
        Vertical -   If fType is Vertical, the second point of the two-point line will be two bytes and will consist of only the Y coordinate in unsigned integer format. The X coordinate of the second point is the same as the X coordinate of the first point.

The first point and the diagonal line second point use the unsigned integer 3 BYTE format where the remaining bits are defined as:

- X coordinate (11 bits)
    b13–b3
        x  - unsigned integer value of X coordinate.
- Y coordinate (10 bits)
    b23–b14
        y  - unsigned integer value of Y coordinate.

The second point of horizontal or vertical lines use the 2 BYTE format where the remaining bits are defined as:

- X or Y coordinate (13 bits)
    b15–b3
        u  - Value of X or Y coordinate in unsigned integer format.

Remarks:
If fType is Horizontal, the value sent will be the X coordinate of the second point of the line. The Y coordinate will not be sent since it is the same as the Y coordinate of the first point.

If fType is Vertical, the value sent will be the Y coordinate of the second point of the line. The X coordinate will not be sent since it is the same as the X coordinate of the first point.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for the lossless compression of graphical line data for transmission over a low bandwidth communication transport mechanism to a graphical user interface of a workstation in a distributed computer system, the graphical line data representative of a graphical line to be displayed on a display screen of the workstation, comprising:
    a) determining, from said graphical line data, coordinate locations for the endpoints of each sub-path of the graphical line;
    b) determining, from said graphical line data, attributes of each sub-path;
    c) representing said coordinate locations as compressed coordinate location data of variable length without any data loss of said coordinate locations;
    d) representing said attributes as compressed attribute data of variable length without any data loss of said attributes;
    e) determining, from said graphical line data, a flag indicator containing information applicable to at least one sub-path of the graphical line, said flag indicator identifying a state of at least one attribute, wherein said at least one attribute is selectively encoded as part of said compressed attribute data in accordance with said flag indicator; and
    f) providing a compressed line data packet of variable length which includes said compressed coordinate location data, compressed attribute data, and flag indicator for each sub-path.

2. The method of claim 1 wherein the compress ed line data packet fully defines the characteristics of the graphical line.

3. The method of claim 1 wherein said attributes include clipping, style, gaps, color and type.

4. The method of claim 3 wherein said style of each sub-path is solid, alternate, dash, dot, dashdot, dashdotdot, mask or array.

5. The method of claim 3 wherein said type of each sub-path is normal, horizontal, vertical, diagonal or ellipse.

6. The method of claim 1, wherein the flag indicator identifies a state of at least one coordinate location.

7. The method of claim 1, wherein the flag indicator identifies a transitional state of at least one attribute between the current compressed line data packet and a previous compressed line data packet.

8. A method for the lossless compression of graphical line data for transmission over a low bandwidth communication transport mechanism to a graphical user interface of a workstation in a distributed computer system, the graphical line data including at least one sub-path and representative of a graphical line to be displayed on a display screen of the workstation, comprising:
    a) determining, from said graphical line data, coordinate locations for the endpoints of each sub-path included in the graphical line data;
    b) determining, from said graphical line data, attributes of each sub-path;
    c) storing an attribute indicator in a compressed line data packet, said attribute indicator including information applicable to said at least one sub-path included in the graphical line data, wherein said attribute indicator identifies a state of at least one attribute that is selectively encoded as part of the compressed line data packet in accordance with said attribute indicator; and
    d) storing a sub-path information field, including encoded endpoint information, in the compressed line data packet, wherein said compressed line data packet is fully reversible for said coordinate locations and attributes.

9. The method of claim 8 further comprising, before step (c), the step of storing a protocol indicator flag.

10. The method of claim 8 wherein the attribute indicator comprises information identifying the color of the graphical line data.

11. The method of claim 10 wherein the attribute indicator comprises a one bit field if the color of the graphical line data is the same as an immediately previous graphical line data.

12. The method of claim 10 wherein the attribute indicator comprises a one byte field if the color of the graphical line data is different from an immediately previous graphical line data, the one byte field encoding the color of the current graphical line data.

13. The method of claim 8 wherein the attribute indicator comprises information identifying the style of the graphical line data.

14. The method of claim 8 wherein the attribute indicator comprises clipping information for the graphical line data.

15. The method of claim 8 further comprising the step of transmitting the compressed line data packet.

16. The method of claim 8, wherein the attribute indicator identifies a transitional state of at least one attribute between the current compressed line data packet and a previous compressed line data packet.

* * * * *